Oct. 11, 1949. J. J. STEINBERGER 2,484,058
METHOD AND APPARATUS FOR INTEGRATING
INFORMATION CONCERNING PRODUCTION
AND OTHER OPERATING SCHEDULES
Filed Feb. 24, 1943 3 Sheets-Sheet 1
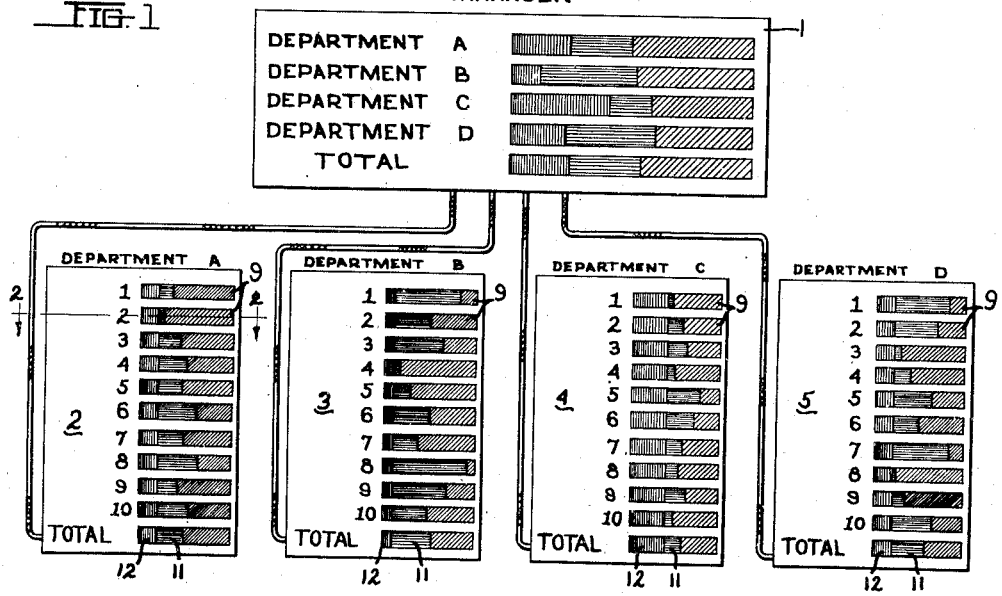
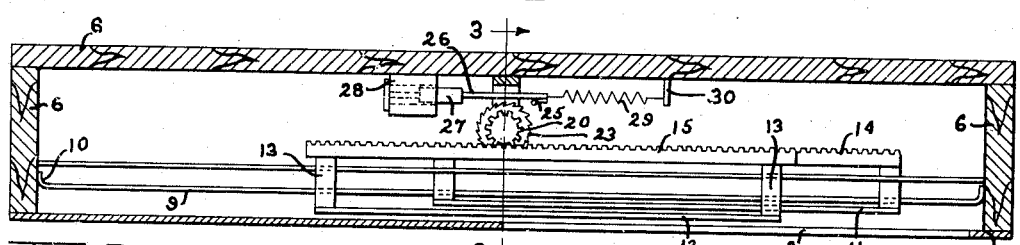
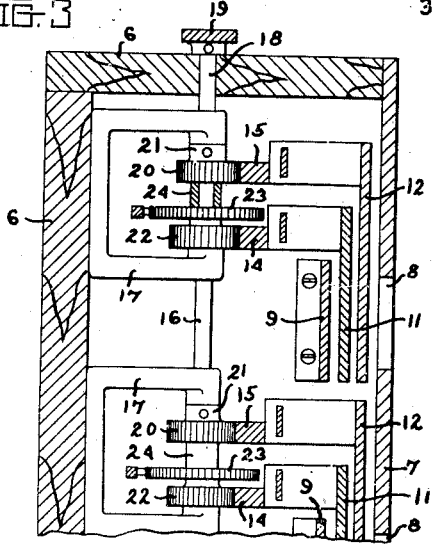
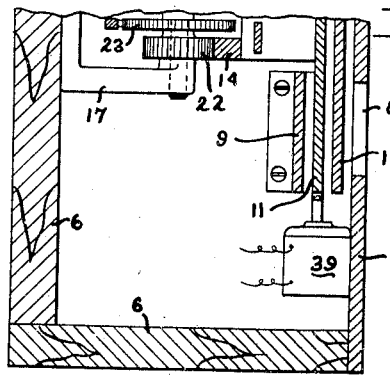
INVENTOR
JOHN J STEINBERGER
BY
Toulmin & Toulmin
ATTORNEY Oct. 11, 1949.   J. J. STEINBERGER   2,484,058
METHOD AND APPARATUS FOR INTEGRATING
INFORMATION CONCERNING PRODUCTION
AND OTHER OPERATING SCHEDULES
Filed Feb. 24, 1943   3 Sheets-Sheet 2
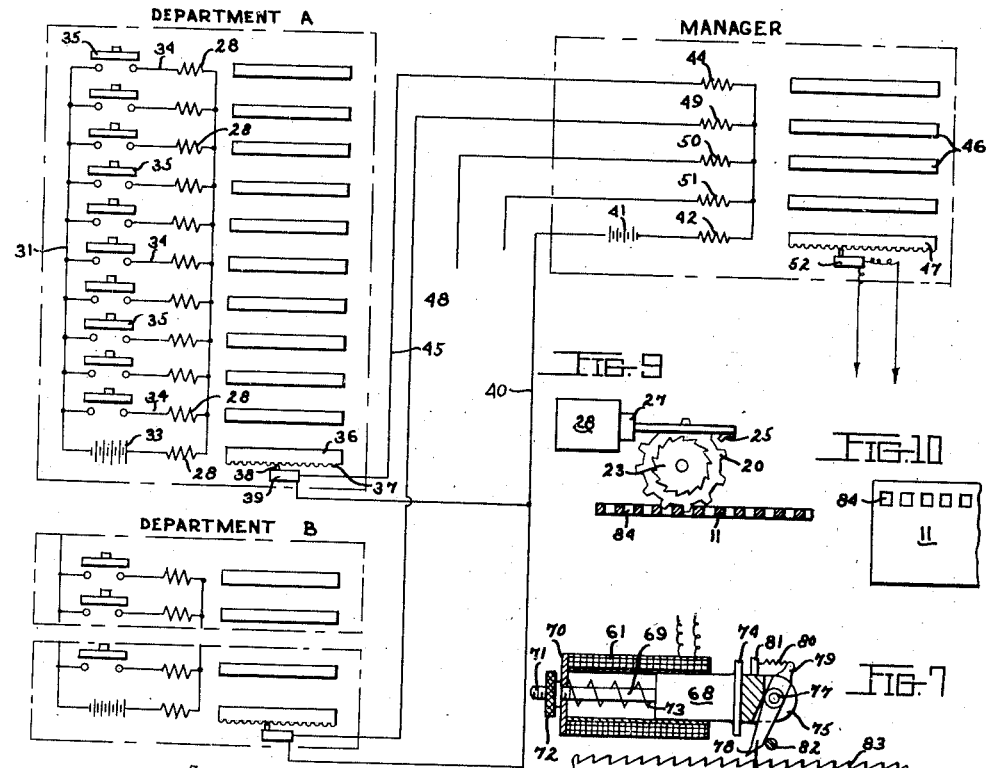
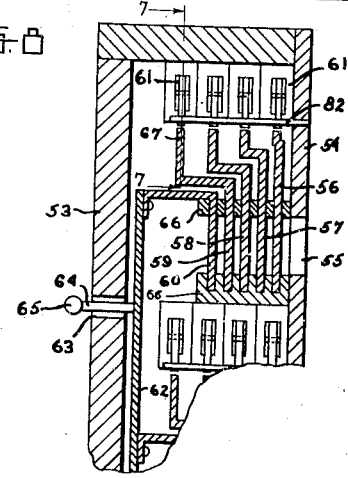
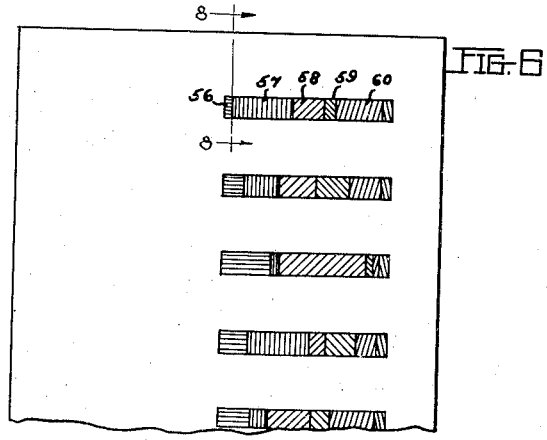
INVENTOR
JOHN J. STEINBERGER
BY
Taulmin & Taulmin
ATTORNEY Oct. 11, 1949.
J. J. STEINBERGER
2,484,058
METHOD AND APPARATUS FOR INTEGRATING
INFORMATION CONCERNING PRODUCTION
AND OTHER OPERATING SCHEDULES
Filed Feb. 24, 1943
3 Sheets-Sheet 3
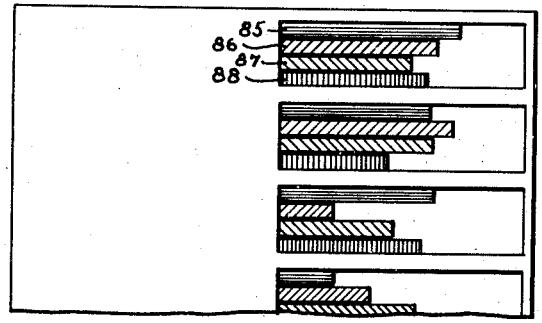
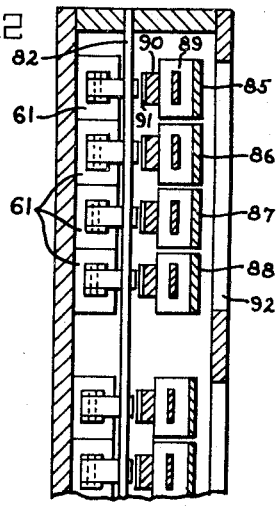
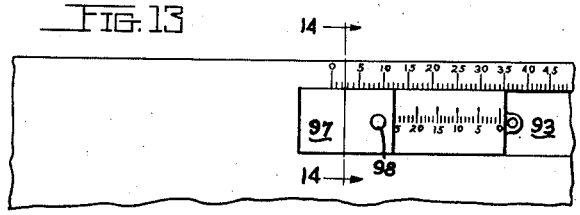
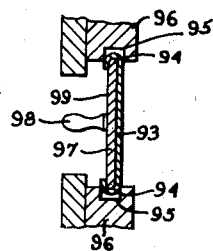
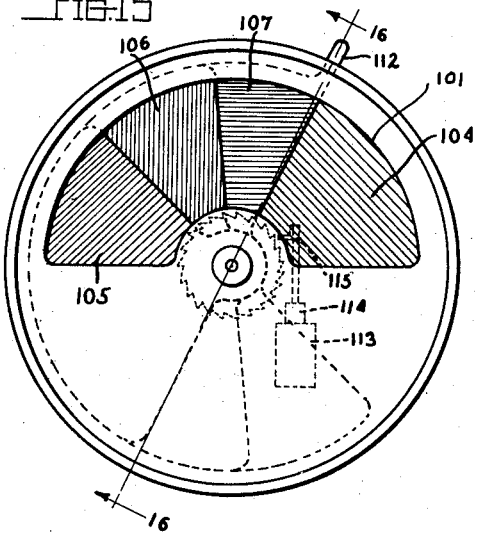
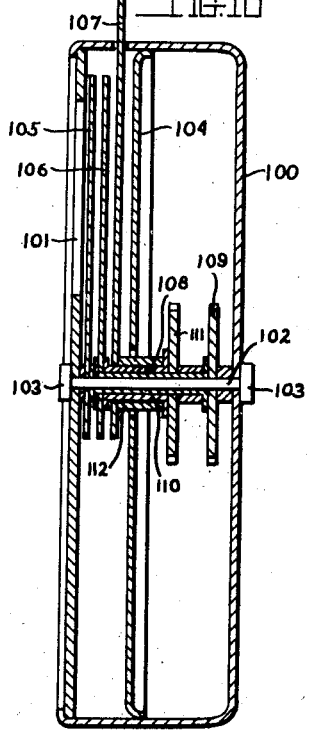
INVENTOR
JOHN J. STEINBERGER
BY
Toulmin & Toulmin
ATTORNEY Patented Oct. 11, 1949

2,484,058

UNITED STATES PATENT OFFICE 2,484,058

METHOD AND APPARATUS FOR INTEGRATING INFORMATION CONCERNING PRODUCTION AND OTHER OPERATING SCHEDULES

John J. Steinberger, St. Paris, Ohio

Application February 24, 1943, Serial No. 476,996

9 Claims. (Cl. 177—328)

The present invention relates to indicating means and especially to means for totalizing and averaging tabulations or indicators that show and integrate comparatively the progress made in certain subjects, departments or by various individuals.

In the so-called line production work or in other places where activities progress according to a predetermined schedule, it is not only necessary to indicate the progress being made on the work by a chart or charts, but also automatically to totalize the various individual activities, particularly in terms of the work to be accomplished so as to adjust parts of the schedule here and there and otherwise to furnish supervisory control.

In addition to the production control problem referred to immediately above, it may also be desirable to collect statistical information from a number of different uncorrelated sources and automatically to correlate and to digest this information to form an intelligent overall picture of the conditions so that a supervisor at a single glance is given the overall picture of the general situation without having to investigate the individual activities which form part of the integrated whole. Such a supervisor may have a number of activities under his control and it may be that the supervisor represents only one of a number of such persons, all responsible for a plurality of activities and all of whom report to a head supervisor to whom a general picture of the under supervisors' activities must be presented in a general way.

The present invention is not limited to any particular number of activities, groups of activities or to any number of supervisors or groups of supervisors, but contemplates the extension of a totalizing, integrating or averaging apparatus or system to serve any types of activity or any mode of collecting and disseminating information for control or for interest or pleasure purposes.

The primary object of the invention is to provide improved apparatus for facilitating supervisory control over a plurality of activities such as the progress of work being done throughout scattered places and combining this information with similar information obtained from other sources of activity to give an accurate overall picture of the entire aggregate of activity.

Another object is to provide an improved apparatus for graphically representing the changes in a progress schedule or other activity which requires the performance of units of work done over predetermined periods of time and in a particular sequence.

Still another object is to provide apparatus for totalizing a plurality of rates of work performance and showing the integrating rate, average rate, minimum or maximum rates on a suitable indicator and automatically conveying the desired information to a position remote from where the work is being performed.

These objects are attained in brief by the use of a plurality of indicators each of which is positioned at the place or station which provides the initial information and these indicators are correlated in an improved manner with an integrating and averaging indicator and the latter automatically transmits the integrated information, preferably by way of an additional bar indicator or indicators to a managerial or supervisory station.

The invention will be better understood when reference is made to the following description considered in connection with the accompanying drawings in which:

Figure 1 is a schematic view of a supervisory control or inspection system improved in accordance with the principles of the present invention.

Figure 2 is a section taken along a line 2—2 in Figure 1 and showing the details of a typical form of actuator for operating the individual indicators.

Figure 3 depicts a transverse sectional view of the indicator shown in Figure 2 but somewhat enlarged, this view being taken along line 3—3 in that figure.

Figure 4 is a view of the lower end of the housing and contents shown in Figure 3.

Figure 5 illustrates an exemplary form of electrical system which may be employed to initiate and control the impulses for operating the improved indicator.

Figure 6 illustrates a somewhat different form of indicator than is shown in Figure 1.

Figure 7 is a sectional view taken through one of the electromagnetic actuators.

Figure 8 is an enlarged fragmentary sectional view taken along line 8—8 in Figure 6.

Figures 9 and 10 show a modified method of actuating the indicators.

Figure 11 illustrates still another form that the indicator might take and Figure 12 shows the manner in which the elements of the indicator of Figure 11 may be arranged in a housing.

Figure 13 is a fragmentary plan view of one of the indicator structures while Figure 14 illustrates a sectional view taken along line 14—14 in Figure 13.

Figure 15 is a plan view of a circular or disc form of the indicator improved in accordance with the present invention, and Figure 16 depicts an enlarged sectional view of the device shown in Figure 15, the view being taken along line 16—16 in that figure.

Referring to Figure 1, reference character 1 designates an exemplary position or station which is indicated as that of a manager or supervisor. Reference characters 2, 3, 4 and 5 represent stations which may be positioned in Departments A, B, C and D respectively, for example of a machine shop. Department A may constitute a stock room from which the material to be fabricated into finished products is obtained. Departments B and C may represent fabricating and sub-assembly stations while Department D may constitute a complete assembly and shipment station. It will be understood that in practice as many departments may be provided for the purpose of the present invention as there are individual activities or groups of activities to be accomplished, all of which lead to the final result of producing and shipping the maximum number of the finished product.

Considering the individual departments separately, Department A may be subdivided into ten groups which may represent different classes or types of stock which contribute in some degree to the finished product. At each of these ten positions, there is an indicator which will be explained in detail hereinafter and while each indicator has the same length as illustrated to indicate the amount of any particular stock on hand, there is provided a visual adjustable member to indicate the proportional amount of each stock being currently used. For example, unit No. 1 is shown as a horizontal column having three divisions as is brought out by the difference in the cross sectional lines to indicate differences of color. The total length of indicator No. 1 (Department A) may represent the amount of that particular stock which was initially on hand and had been put into the stockroom to complete the full order of the finished product. The combined lengths of the two left hand subdivisions may represent the amount of that stock which had left the stock room and was presumably in the process of fabrication. The difference between this combined length and the total length of indicator No. 1 would tell the stock room keeper how much of the stock he had on hand subject to further call by the fabricating departments. The left hand subdivision of indicator No. 1 represents the number of assembled and ready-to-ship units in terms of the amount of the specific stock which has gone into these units.

Indicator No. 2 is similar to indicator No. 1 except that it applies to a different type of stock so that the combined lengths of the two left hand subdivisions of indicator No. 2 would be different from the combined lengths of the corresponding subdivisions in indicator No. 1, indicating that the fabricating departments have called for a less amount of stock No. 2 than for stock No. 1.

In indicator No. 3, a greater amount of stock No. 3 i. e. in length or quantity had been obtained from the stock room than in the case of stocks Nos. 1 and 2 and corresponding analyses may be made of all of the ten indicators in Department A. It will be noted that the left hand subdivision of each of the indicators 1 to 10 has approximately the same length and this length is equal to the length of the left hand subdivision of the graphs 1 to 10 shown at Department D. The reason for this equality of lengths is that Department D represents the final station in the production schedule and the left hand subdivision indicates each of the numbers of units or the amount of material i. e. in length of stock or quantity which has gone into those assemblies completely finished and ready to ship, since this represents a single figure, the lengths of the subdivisions would obviously be the same.

It will be understood that the total length of each indicator 9 in department A when added together represents the total amount of stock or other materials taken from the stock room. This stock has been subdivided among ten workmen. The amount of that stock on which a given workman has actually been working or has actually used in a finished article is represented by the addition of the two left hand subdivsions in any one of the indicators 1 to 10 shown in Dept. A. That portion of the stock or materials on which the workman has been working but has actually completed and has turned over to Dept. B for further work is indicated by the left hand subdivision in any one of the indicators 1 to 10 in Dept. A. The stock that has actually been transferred to Dept. B under these circumstances is now represented by the entire length of each of any of the indicators 1 to 10 in Dept. B. Here again, that portion of the material which has been turned over to Dept. B by a workman in Dept. A which is being currently worked upon by a workman in Dept. B is represented by the addition of the two lefthand subdivisions in any one of the indicators 1 to 10 in Dept. B. But any portion of that work actually completed by a workman in Dept. B and turned over to a corresponding workman in Dept. C is indicated by the lefthand subdivision of the corresponding indicator shown in Dept. B. Obviously, as workman 1 in Dept. B completes his entire job as represented by the full length of indicator 1 in that department, the entire work is turned over to workman 1 in Dept. C so that the indicator 1 in Dept. C is obviously of the same length as indicator 1 in Dept. B.

It must be pointed out that Departments A, B, C and D are all inter-related through an electrical or mechanical system in such a manner that any of the indications shown by the indicators at the different departments may be duplicated if desired at any other of the stations. The stock room keeper would be most interested to know as to the number of parts actually finished and ready to ship so that the information derived from Dep't D is transmitted back to Dep't A, thus giving the stock room keeper an accurate appraisement of the speed with which the stock under his charge is being used in the finished products.

It may be desirable to totalize and average the changes shown by the various indicators 1 to 10 so that the stock man is able to summarize the changes in the amount of all of his stock changes being used or on hand and these sum totals and averages may be transmitted to a manager or supervisor as indicated in Figure 1.

It will be understood that each of the indicators 1 to 10 is manually operated by the stockroom keeper as will be explained more fully hereinafter and the actuation of the indicator 1 to 10 automatically causes a corresponding or equivalent movement of the average indicator in Dep't A. If the automatic movement of the average indicator is one-tenth the movement of any one of the indicators 1 to 10, the movement of the average indicator will represent the average of all of the movements of the individual indicators 1 to 10. This consideration might be quite important in case indicators 1 to 10, instead of representing stock on hand or stock being used, indicated the amount of work done by ten individuals in which case the totalizer and averaging indicator would show at a glance the average amount of work per man with which the work done by any particular man could be compared to determine whether he was faster or slower than the average.

Referring now to Dep't B within the rectangle designated 3, the total lengths of the bar indicators 1 to 10 represent the amount of material received from Dep't A and the individual subdivisions may indicate the member of subassemblies or parts which had been made by the individual workman ready to be turned over to Dep't C for further work. Thus, the full length of each indicator may represent the stock furnished to a given workman and the combined length of the two left hand subdivisions may represent the number of articles or parts, subassemblies which that workman has completed and finally the left hand subdivision in each indicator may represent the number of parts which are completely finished and have been turned over to Dep't C.

In certain types of a production schedule, the full length of indicator No. 2 in Dep't B may represent the number of subassemblies turned over to a workman by a workman associated with graph No. 1 so that the aggregate lengths of the two lefthand subdivisions might represent the amount of work done by workman No. 2 on the subassemblies which have been turned over to him by workman No. 1. The indicators shown in Dep't B are totalized and averaged, as in the case of Dep't A, the various subdivisions of the average indicator representing the average amounts indicated by indicators 1 to 10, assuming that the movement of the average indicator is one-tenth of the movement of the indicators 1 to 10.

It will be noted that in the average indicator of Dep't B the left-hand subdivision shows the same length of indicator as the corresponding subdivisions of the indicators 1 to 10. The reason for this is that this left-hand average indicator subdivision may represent the amount of work turned over to Dep't C which obviously cannot be greater than the output of the slowest man of the group whose work is collectively shown by the graphs 1 to 10.

The finished output of Dep't B may be turned over to Dep't C and this output may be divided into ten parts so as to provide work for the men 1 to 10. Thus, the total length of each indicator represents the amount of work placed in front of each man and the aggregate length of the two left-hand subdivisions represents the amount of work which has been done by a particular man toward his full quota. This work is totalized and averaged on the bottom indicator of Dep't C, the average being represented by the aggregate average lengths of the two left-hand subdivisions, assuming that the average indicator operates only one-tenth as fast as the individual indicators 1 to 10. The left-hand subdivisions of equal length which are registered on all of the indicators represent the amount of work or units which are either ready or have been turned over to Dep't D for final assembly and shipping.

Thus, each of the ten men in Dep't D receives one-tenth of the output of Dep't C as indicated by the full length of each indicator. The output of each man is indicated by the aggregate length of the two left-hand subdivisions of each indicator and the output of the department as a whole is represented by the left-hand subdivision. These outputs are totalized on the indicator shown at the bottom of the rectangle 5 which is so arranged as to give an average indication of the movements of the individual indicators. As stated hereinbefore, the output of Dep't D which may represent an actual shipment record, since it is the last department in the line of production, may also show in the bar indicators of Dep't A as the left-hand subdivision to give the stock room keeper in Dep't A a check-up between the articles being shipped and the material on hand from which the articles are made.

The average indicators appearing at the bottom of the rectangles 2, 3, 4 and 5 may, if desired be located on the foreman's desk, remote from the indicators 1 to 10 of each department although more usual, the average indicator will be positioned with other indicators to which it pertains. These individual average values are transmitted either electrically or mechanically as will be described hereinafter to the manager's office indicated at 1 who, by means of his own indicators can tell quickly the condition of business, work received and work done, by the various departments A, B, C and D. Thus, the indications shown by the average indicators Dep'ts A, B, C and D are duplicated in any desired scale on a graphical chart in the manager's office. The advantages of this arrangement are many. If it were assumed that Dep'ts A, B, C and D were in competition and each group was working on the same line of production, the manager could determine as to which department was ahead or falling behind the other departments and by means of an average indicator which averages the performance of the departments A, B, C and D, the manager could determine as to which department was producing goods at a higher or lower rate than the average. If a department produced less goods than the average, the manager would consult the foreman of that department who in turn would examine the indicators in his department and determine which department was less efficient than the average which average would be shown by that department's average indicator and the reasons for this decreased efficiency.

In the case of large plants, there may be a number of managers employed under the direction of a chief executive or president, in which case the manager's average indicator results would be conveyed either electrically or mechanically to a series of bar indicators located in the President's office who would then be in a position to determine the relative efficiencies of the various managers and which manager was higher or lower than the aggregate average as shown by the average indicator of the President's indicators. It will be understood that the average indicator responds automatically to the movements of the various indicators but at a proportionate speed in order to give average indications.

As shown in Figures 2, 3 and 4, each group of indicators 1 to 10 may be contained in a wooden casing or box 6, preferably of rectangular configuration and closed on all sides except at the cover 7 which is provided with a series of slotted openings 8 positioned directly in front of the first indicator 12. The openings 8 preferably extend for a distance to expose the entire length of each indicator 12, 11 and 9. The indicator elements may comprise strips of metal, Celluloid, plastic material, or any other suitable hard substance. The background strip 9 may extend the full length of the box and is secured at its ends to the box in any suitable manner, for example by up-turned portions 10 which are screwed to the box. It will be understood that the background strip is stationary since it represents the total amount of work assigned to the individual workman or the total amount of a particular stock on hand and therefore represents the total distance over which the variable parts of each indicator can move. As illustrated, these background strips 9 may be colored brown as indicated by the diagonal cross hatch in Figure 1. There are preferably two movable strips in each horizontal indicator, one of the strips being indicated at 11 and the other at 12 in Figure 2. The strips 11, 12 may be supported on carriages formed of end supports 13 and racks 14, 15 respectively. These racks are adapted to slide along the width of the box as will be explained hereinafter and for that reason are carried in suitably positioned grooves or on the necessary slidable supports (not shown).

A convenient way of arranging the strips 9, 11 and 12 is shown in Figure 3. Strip 12 may comprise a wide member, the lower portion of which is directly opposite the slotted opening 8 while the strip 11 is of less width than the strip 12 and finally the background strip 9 is narrower than either of strips 11 or 12. Extending transversely of the box there is a shaft 16 which is journalled throughout its length in a plurality of bearings formed by a number of rectangularly shaped brackets 17 secured to the bottom plate of the box. This shaft projects out through the side of the box as indicated at 18 and terminates in a knurled knob 19 pinned to the shaft. Pinions 20 are secured to the shaft as indicated at 21 and positioned in meshing engagement with each of the racks 15. There are corresponding pinions 22 positioned on the shaft 16 and engaging each of the racks 14. However, the pinions 22 are mounted loose on the shaft. Each of the pinions 22 carries a ratchet wheel 23 which is positioned between the said pinion and the adjacent pinion 20 but spaced from the latter by means of a spacing collar 24. Inasmuch as the ratchet wheel 23 is secured to the pinion 22, the wheel is also loosely mounted on the shaft 16. The pawls 25 for operating the wheels 23 are each carried on a rod 26 which terminates in a plunger 27 adapted to be attracted and received by a solenoid 28. The rod 26 is connected through a tension spring 29 to a fixed support 30. The arrangement is such that when the solenoid 28 is intermittently energized in a manner which will be described, the pawl 25 will index the ratchet wheel 23 and will rotate the pinion 22 to cause the rack 14 to move to the right (Figure 2) over a distance depending on the number of indexing impulses. Thus by energizing the solenoid 28, the strip or flag 11 is caused to expose increments of length to an observer looking through the openings 8.

In order to move the strip or flag 12, the shaft 16 is rotated at the thumb nut 19 causing the pinions 20 to rotate and to move the various racks 15 similar distances to the right as seen in Figure 2, thus carrying the strips 12 corresponding distances in the same direction. It will be noted that a rotation of the thumb screw 19 moves all of the strips 12 simultaneously because each of the pinions 20 is pinned to the common shaft 16. But the strips or flags 11 are given an individual movement by their respective ratchet wheels 23 which are not secured to the shaft but merely loosely mounted thereon.

It may be desirable to locate the average indicator in the same casing as the individual indicators 1 to 10 and such a construction is shown in Figure 4. It has been explained that the lowermost strips 11, 12 as shown in Figure 1 integrate all of the movements of the indicators 1 to 10 and are operated at a reduced speed proportional to the speed of the individual indicators to give average indications. Assuming that the average indicator has a background strip 9, an intermediate strip 11 and a front strip 12 similar to the indicators 1 to 10, the matter of proportionate speed of the movable strips 11, 12 (Figure 4) can be accommodated by the gear ratios between the various actuating pinions and the racks associated with the respective strips. Thus, the strip 11 of the averaging indicator may be actuated through the ratchet wheel 23 and an electromagnetically operated pawl similar to the indicators 1 to 10 while the strip 12 may be operated through a rack and a cooperating pinion which is fixedly secured to the shaft 16. Consequently, when the thumb nut 19 is rotated, all of the strips or flags 12 including that of the average indicator, are moved through the same distance as is clearly shown by the first subdivision of the indicators illustrated under the various departments A, B, C and D in Figure 1.

A typical form of electrical circuit that may be employed to energize the electromagnets 28 is shown in Figure 5, and will be explained now.

Each of the departments A, B, C and D has its own electrical system and there are outgoing lines from each system to the manager's position in order to actuate the indicators located at that point. The various actuating coils of the electromagnets 28 for actuating the indicators and including that of the average indicator are connected in parallel between a pair of lines to which energy is supplied by a battery 33. In each of the branch lines 34 there may be connected a push-button switch indicated at 35 which, upon being depressed allows the coil in its immediately associated circuit to be energized from the battery. Assume that the first push button 35 is depressed, the top coil 28 would be energized, causing the movable strip or flag 11 of the first indicator to be moved to the right as seen in Figure 2. It is apparent that in order to continue to move the strip 11 to the right, the push button will have to be alternately pressed and then released until the strip has been moved in steps to the desired position, thus indicating the amount of progress accomplished toward completing his assigned work by the person operating the push button. In case Dep't A were a stock room, the stock keeper would intermittently press the button in order to move the movable strip 11 a distance such as to indicate the amount of material which has been taken out of stock and used for fabrication of the articles or subassemblies being made. After the first strip or indicator 11 has been moved to its proper position, workman No. 2 may press the second push button in order to move his indicator or strip to the right and thus indicate the progress or amount of work accomplished toward the complete job.

In the case of the stock room keeper, No. 2 push button would be operated to indicate the amount of material No. 2 which had been taken out of stock. This procedure takes place with respect to all of the ten indicators. It will be noted in Figure 5 that every time any one of the push buttons 35 is depressed, the energizing coil 28 of the average indicator is given an electrical impulse, this coil being shown directly to the right of the battery 33 and opposite the average indicator 36. In the case of a stock room keeper, it would of course be difficult to operate more than one button at a time, but in case the indicators were being operated by different workmen, it might be arranged that each of the workmen pushes his button the required number of times depending on the units of work done, at different periods throughout the day. It is apparent that the average indicator is moved through distances which correspond to the aggregate number of the impulses produced by all of the push buttons in a single department. However, in practice, the gearing within the average indicator will be so designed as to permit this indicator or strip to move only a fraction of the distance through which the individual indicators 1 to 10 are operated. Actually, the average indicator strip 11 would be moved only through one-tenth the distance of any one of the indicators 1 to 10. In this manner, the movement of the average indicator strip would represent the average movement of all of the strips in the indicators 1 to 10.

It will be understood that as the strip 11 is moved to the right, it covers up increasing amounts of the background strip 9 but is readily distinguishable from the background strip by the difference in colors. Likewise, movement of the indicators or strips 12 to the right by operating the knob 19 causes more and more of the area of the underlying strips 11 to be covered up and the relative lengths of these strips can also be readily determined by the difference in colors as is explained hereinbefore.

The system which has been explained with respect to Dep't A in Figure 5 is also duplicated at Dep'ts B, C and D, keeping in mind that the movements of the indicators in the last three mentioned departments may be made to note entirely different factors or different progresses, than the indicator shown in Dep't A. Only the uppermost and lowermost portions of the system of Dep't B have been illustrated in Figure 5 and none of the circuits of Dep'ts C and D are shown.

Each strip 11 of the average indicators 36 (Figure 5) may be provided with a serrated edge 37 in any suitable manner and these depressions may receive the movable contact member 38 of a microswitch 39 of any suitable and well known type. The microswitch may be connected through conductors 40 to a battery 41 located at the manager's position, then passing through an average indicator coil 42 and then by a conductor 43 to the coil 44 of an indicator mechanism and finally through the conductor 45 back to the switch. In addition to the coils 42, 44, there is positioned at the manager's station a plurality of indicators 46 which are similar to those which have been described in connection with Figures 1 to 4 and an average indicator 47 which is similar to the average indicator 36 described hereinbefore. As the average indicator 36 moves to the right in response to the impulse energization of its coil 28, the movable contact of the microswitch 39 will make and break the circuit through the battery 41 and therefore will cause impulses to flow through the coils 44 and 42. At the manager's position there are similar coils 49, 50 and 51, cooperating with the average indicator of each of Dep'ts B, C and D and these coils have a conductor 40 in common with the battery 41 and the average indicator coil 42 but an individual conductor 48 to each of the average indicators B, C and D.

Thus, as in the case of the system shown in Figure 5, the average indicator coil 42 receives in succession all of the impulses which pass through any of the coils 44, 49, 50 and 51 and thus totalizes these impulses. The strip or flag of the totalizer 47 may be actuated by its actuating coil 42 as to move through only a fraction of the distance that the individual strips or flags 46 move. In case the number of indicators 46 is four, the strip or flag of the average indicator 47 might be arranged to operate at one-fourth the distance through which the other flags or strips operate. Thus, the average indicator strip would move in the aggregate a distance which is the average of all of the distances through which the other strips move at the manager's station.

It may be desirable to carry the monitoring system to the President's desk where the President employs a number of managers and who in turn supervise a number of departments per manager. Thus, as the strip of the average indicator 47 is operated, a microswitch 52 may be caused to transmit impulses in the same manner as microswitch 39 but to an indicator structure positioned at the President's or manufacturing Vice-President's office. An arrangement similar to that shown to the right in Figure 5 may be provided at the President's station on which the individual total of each manager is automatically and visually indicated by means of the described indicator structures. Thus, the President, by merely glancing at the indicators, can obtain an overall picture of the working of his entire plant. He can determine the comparative efficiencies of his managers since the output of each managerial group is shown in comparison on the President's chart. If desired, the manually-operated series of strips 12 showing the output from any group of departments or from the plant as a whole may be carried into the indicator structures both at the managerial and at the President's stations.

While I have shown and described an electrical system at each department and station for averaging the impulses produced at that department or station, it will be understood that the invention is not limited to this particular system nor indeed to an electrical arrangement at all. If desired, the averaging effects may be obtained purely by mechanical means, levers, linkages etc. and a system of inner locks may be readily provided to prevent the simultaneous operation at any one department of two or more indicators or strips as is well known in the art.

Another form which the indicator structure may take is illustrated in Figures 6, 7 and 8. The indicators and their operating mechanism are contained in a housing or box 53 which has a front cover 54 provided with a series of slots 55 through which the flags or strips can be observed. In each group of indicator sections, there are four electromagnetically operated strips or flags indicated at 56, 57, 58 and 59 respectively and also a manually movable background flag or strip 60. The electromagnets for operating the individual strips are indicated at 61 and an enlarged view of each electromagnetic device is illustrated in Figure 7. Within the container 53 there may be provided as many groups of the indicators or strips 56 to 60 as are necessary to indicate and visualize the progress of the work at hand.

It will be noted that the strips 56 to 59 in each section are independent of one another and independent of the corresponding strips in the other section but the background strip 60 is common to all of the sections since their strip forms part of a structure indicated at 62 which joins the corresponding strips 60 of the various sections. The back of the box 53 is provided with a slot which loosely receives a rod 64 terminating in a knob 65, this rod being connected to the structure 62 for the purpose of sliding the common background strip 60 through equal distances throughout the sections.

It will be understood that all of the strips 56 to 60 in each section are suitably mounted at 66 to permit a sliding motion longitudinally of the box. Then strips 56 to 59 are given an angular configuration as indicated at 67 so as to terminate at a position directly below their respective solenoids 61. The solenoids are arranged horizontally within the box as shown in Figure 8 and may be adapted to receive a plunger 68 which is provided at one end with a rod 69 and this rod projects through a cover plate 70 secured to the solenoid. The rod is provided at its end with threads 71 for receiving a knurled nut 72. The latter serves to limit the movement of the plunger 68. There is a compression spring 73 surrounding the rod 69 and positioned between the cover plate 70 and the plunger 68. At the other end the plunger is provided with a flange 74 and terminates in a yoke 75. There is a lever 76 pivoted at 77 and positioned between the yoke portions and this lever terminates in a pawl portion 78. The lever 76 terminates at a position above the pivot 77 in a lug 79 to which one end of a tension spring 80 is secured. The other end of the spring connects with a pin 81 driven into the plunger.

There is a solenoid and its associated mechanism provided immediately above each of the angularly disposed strip portions 67 (Figure 8) and a rod 82 extends inwardly from the cover 54 of the box to a position in which it will contact the side of each lever 76 as can be seen in Figure 7. The angular portions 67 of the indicators or strips are provided at their uppermost edges with teeth 83, the arrangement being such that as the plunger 68 (Figure 7) is moved to the left, the lever 76 falls out of engagement with the rod 82 and assuming that the slot in the yoke portion has been cut to the proper angle, the tooth 78 of the lever 76 will engage one of the teeth 83 and will move the portion 67 to the left (Figure 7). Thus, each of the strips 56 to 59 may be moved through different distances by simply intermittently energizing their respective solenoids 61. It is apparent that as the solenoid is de-energized, the compression spring 73 forces the plunger 68 to the right (Figure 7) and the lever 76 will strike the rod 82 and force the pawl 78 out of engagement with the teeth 83. The spring 80 serves to make the last-mentioned operation more positive since it tends to rotate the lever 76 counterclockwise about its pivot 77. Thus the flags or indicators 56 to 59 are electrically operated by their respective solenoids and through any desired distance or distances but the background flag 60 is preferably moved manually by sliding the rod 64 along its slot 63.

The structure shown in Figure 8 has the advantage over the device illustrated in Figure 3 in that the width of the box 53 may be made much smaller than box 6. This advantage of smaller dimension is brought about by the improved position of the solenoids 61 with respect to their respective flags or indicators. It is also apparent that the structure shown in Figure 8 lends itself to the accommodation of greater numbers of the indicators or flags than would be possible in the case of the structure shown in Figure 3. It will be understood that the solenoids 61 may be connected in a circuit similar to that described in connection with Figure 5 or instead of providing solenoids, mechanical actuating devices may be employed operable through levers or in any other manner by the individual workman to indicate their respective outputs of work.

Whereas the background trip or indicator 9 in Figures 1 to 4 is stationary, the corresponding element in Figures 6 and 8 is movable and this arrangement might offer certain advantages depending on the factors or values being shown on the indicator. For example, the total amount of work assigned to a man may change from day to day so that it may be necessary to increase or reduce the length of the background strip or flag and this may be readily accomplished by simply moving the rod 64 along its slot 63. As in the case of the other indicators explained hereinbefore, the various strips 56 to 60 all carry different colors so that the relative or proportional lengths of the indicators may be readily seen through the openings 55.

In Figures 9 and 10, there is shown a modified form that the strip actuator may take. Instead of providing racks 14 and 15 (Figure 2) on each of the flags or strips, the pinion 20 may be caused to enter rectangular slots 84 which are formed directly in the strip thus lending simplicity to the actuating mechanism.

I have shown in Figures 11 and 12 a still different form that the indicator may take. It was pointed out with respect to Figures 1 to 4, 5, 6 and 8 that the strips of each indicator group overlap one another as viewed from the openings 8 and 55 in the casings and the amount of overlap gave a visual indication of the relative values or factors shown on the indicator. However, it may be desirable to place the strips or flags of each indicator group side by side instead of in an overlapping position. Figures 11 and 12 show a structure of this character. The individual strips, suitably colored, are indicated at 85, 86, 87, 88 and each strip is provided with a suitable actuating element which may take the form of an electro-magnetic device operating through a ratchet wheel and pawl similar to that shown in Figures 2 and 9 or a structure similar to that shown in Figure 7. The last-mentioned structure has actually been illustrated and these devices are indicated at 61. As shown, each of the strips 85 to 88 constitute the front side of a relatively long box-like structure 89 on which is mounted an indicator 90 having teeth 91. These teeth correspond to the teeth 83 described in connection with Figure 7 so that when any one of the solenoids 61 is intermittently energized, the corresponding flag or strip 85 to 88 is moved past the opening 92 in the casing. It will be noted that the rod 82 having the same function as the corresponding rod in Figure 7 extends the entire length of the casing. The arrangement illustrated in Figure 12 offers the advantage of a thin casing or box but the latter is somewhat longer than that shown in Figures 3 and 8 since it must accommodate the indicators positioned in a side by side relation.

Under certain circumstances, depending on the material factors or values being indicated, it may be desirable to provide a numerical index on the movable and stationary portions in order to appraise more accurately the relative movements of the various indicators or strips. Furthermore, instead of operating the indicator automatically through electrical or mechanical devices, it may be desirable to provide bars or strips which can be moved manually by a sliding operation. Such a structure has been illustrated in Figures 13 and 14. The background strip or indicator may be constituted in the form of a guide rail 93 with grooves provided along its edges as indicated at 94 and the groove portions may be received by suitably shaped openings 95 positioned along the inner edges of a pair of oppositely disposed support members 96. The movable strip or bar member 97 is adapted to slide within the grooved portions 94 and for this purpose a handle 98 is provided. The outer surface 99 of the movable strip 97 may be given a different color from the immediately adjacent surface of the stationary strip 93. The advantages of the construction shown in Figure 14 over the other indicators resides in the simplicity of construction and in the ease with which the movable strip 97 may be slid out of position and another strip, perhaps with different markings may be substituted by merely inserting the new strip in the grooves 94. An example of such markings is shown in Figure 13.

At the background strip or at a suitable position along this strip there may be provided graduations 0 to 100 as indicated in the figure while the movable strip 97 may be graduated in the reverse order as is also shown in the figure. Thus, the movable strip 97 can be given its exact position with respect to the stationary strip or background element 93 and based on the indexes or graduations provided on these strips. It is apparent that these indexes or graduations may also be provided on any or all of the indicators illustrated in Figures 1 to 5, 6, 8, 9, 10, 11 and 12 and these graduations may indicate any system of values or pertain to any factors, results or bear any other insignia or indicia which it is desired to have the various indicators indicate and compare. It is apparent that an average indicator may be provided if it is desired for use in connection with the hand operated slidable form of indicator shown in Figures 13 and 14. Such a structure may be operated through suitable gearing and linkages which are responsive to the movements in aggregate of the various slidable strips 97.

Instead of taking the form of an elongated strip or bearing, I may provide a circular indicator structure which is exemplified in Figures 15 and 16. This structure may include a metal casing 100 of circular configuration closed on all sides except at the top where a semi-circular opening indicated at 101 is provided. A shaft 102 with each of heads 103 extends along the thickness of the casing. A background disc 104 extends transversely of the casing and is secured at its peripheral edge to the inner surface of the casing. There are three movable discs of which discs 105 and 106 are rotated, preferably by means of an electromagnet and disc 107 is rotated preferably by a manual means. Disc 105 is mounted on the end of the innermost sleeve 108 the opposite end of which is secured to a ratchet wheel 109. The disc 106 is mounted on the end of an intermediate sleeve 110 which carries at its opposite end a ratchet wheel 111. The sleeves 108 and 110 are adapted to rotate independently of one another and independently of the shaft 102. The manually operated disc 107 is carried on a sleeve or collar 108 which is loosely mounted on the intermediate sleeve 110. The disc 107 is provided with a lug 112 which extends through a slotted opening provided in the outer wall of the casing, the arrangement being such that as the lug is moved around the slot, the disc 107 is given a corresponding movement.

As shown in Figure 15, the discs 105, 106 and 107 may have a semi-circular configuration. There is associated with the ratchet wheels 109 and 111 a solenoid 113, a plunger 114 and a pawl 115, the arrangement being such that when the solenoid 113 is intermittently actuated, the ratchet wheel opposite the pawl 115 is given a clockwise rotation as seen in Figure 15. Each of the solenoids 113 may be energized through a push-button system shown in Figure 5 or in any other suitable manner.

It is apparent that when the disc 107 is rotated by moving the lug 112 greater or less amounts of the background disc 104 are covered up. As the ratchet wheel 111 is operated by its solenoid 113, greater or less amounts of the disc 107 are covered up and similarly as the ratchet wheel 109 is rotated by its electromagnetic device 113 greater or less amounts of the disc 106 are covered up. It is therefore possible by either manipulating the lug 112 or by electrically operating the ratchet wheels 109 and 111 to have the discs show different sized areas depending on the various movements thus given to indicate relations between values, factors or other indicia. The difference in these areas may be emphasized as desired by suitably coloring the various discs as in the case of the rectilinear arranged indicators described hereinbefore.

It is apparent that the various movements of the discs 105, 106 and 107 of a group of indicators may be averaged and the average struck by an electrical circuit similar to that shown in Figure 5 or through the use of a mechanical system including levers, linkages etc. In fact, the circular form of indicator shown in Figures 15, 16 lends itself to all of the operations and systems which are described in connection with Figures 1 and 5. If desired, indexes or graduations similar to those shown in Figures 13 and 14 may also be provided about the various discs and the stationary parts in order to provide accurate determinations of the various disc movements.

While I have described my invention more particularly from the standpoint of graphically indicating the progress of a work production schedule through the various departments under the control of a foreman or manager who in turn may report to a vice-president and all of whom were kept in visual contact with the progress of the work, it is evident that my invention is not limited to this form of activity. The various indicators and averaging devices and the remote control and supervisory systems may be used for any number of uses, for example visually indicating traffic conditions on various highways in a given area such as a town or congested area; the number of vehicles passing and their totals could be shown side by side simultaneously at a given central office or headquarters; likewise, sidewalk traffic, store traffic and attendance at theaters could be indicated for more effective comparison. Attendance records at schools which are laborious but necessary since revenue is based upon them could be greatly simplified by indicating at one main office especially in larger schools. It is desirable to know the individual daily and monthly or period attendance, the percent of attendance daily or monthly and period; and especially the aggregate days of attendance on which revenue is based. For reasons of checking epidemics and other factors affecting school attendance, it is also desirable to know attendance by rooms and grades which can be done effectively and simultaneously by the use of the improved indicators. The teachers or attendance supervisor in each grade or room would simply press the various buttons 35, once for each pupil present each day and the above records would all simultaneously be recorded and the highlights of the records including the averages would be immediately transmitted to the principal's desk.

The improved indicators might also be used to keep sales records of various departments in stores or store systems in which the records are kept visible before the store manager at all times and a comparison between the various totalizers and the cash registers may be made. In addition, the expense charged to each department can be superimposed by the use of overlapping movable strips or flags to the sales record represented by still another movable flag and the profit or loss kept constantly visible.

These examples are set forth to give only a few of the many uses to which the improved indicator structures and systems shown herein may be applied to advantage.

It will be understood that I desire to comprehend within my invention such modifications as come within the scope of the claims and the invention.

Having thus fully described my invention, what I claim as new and desire to secure by Letters Patent, is:

1. Apparatus for visually indicating and comparing the progresses of a number of activities, said apparatus comprising a plurality of graphical elements, each comprising strip portions, one above the other in overlapping relation and possessing different characteristics, and means for changing the amounts of overlap of the elements in accordance with the individual progresses of the various activities in order graphically to represent changes of said progresses.

2. Apparatus for visually indicating and comparing the progresses of a number of related activities, said apparatus comprising a plurality of strips arranged in overlapping relation, one above the other, and movable with respect to one another, said strips possessing different characteristics electrical means for operating one of said strips from a remote position and manual means for operating another of said strips at the position of the strips.

3. Apparatus for visually indicating and comparing the progresses of a number of activities, said apparatus comprising a plurality of strips of distinctive characteristics and arranged one above the other so as to permit visual comparison between the strips, said strips being adapted to be moved to indicate the individual progresses of said activities, said strips being engaged at their edges in guideways through which the strips extend and are adapted to move, means for moving said strips in accordance with the individual progresses to be indicated, said strips being adapted to be removed from their guideways in order to replace or substitute a new form of strip.

4. Apparatus for visually indicating and comparing the rates of doing work by different individuals, machines or departments, said apparatus comprising a plurality of strips of distinctive characteristics and adapted to be moved with respect to one another to denote the various rates, means for operating one of said strips from a remote position, to indicate a particular type of rate and manual means for operating another of said strips at the position of the strips to indicate another type of rate, all of said means including a common shaft on which actuating devices are mounted, said devices comprising gear mechanism carried by said shaft which cooperates with racks carried by said strips.

5. Apparatus for visually indicating and comparing the rates of doing work by different individuals, machines or departments, said apparatus comprising a plurality of strips of distinctive characteristics and adapted to be moved with respect to one another to denote the various rates, means for operating one of said strips from a remote position, to indicate a particular type of rate and manual means for operating another of said strips at the position of the strips to indicate another type of rate, all of said means including a common shaft on which actuating devices are mounted, said devices comprising gear mechanism carried by said shaft which cooperates with racks carried by said strips, the gear mechanism of the manually operated strips being affixed to the shaft and the gear mechanism of the remotely operated strips being loosely mounted on the shaft.

6. Apparatus for visually indicating and comparing the rates of doing work by different individuals, machines or departments, said apparatus comprising a plurality of strips of distinctive characteristics and adapted to be moved with respect to one another to denote the various rates, means for operating one of said strips from a remote position, to indicate a particular type of rate and manual means for operating another of said strips at the position of the strips to indicate another type of rate, all of said means including a common shaft on which actuating devices are mounted, said devices comprising gear mechanism carried by said shaft which cooperates with racks carried by said strips, the gear mechanism of the manually operated strips being affixed to the shaft and the gear mechanism of the remotely operated strips being loosely mounted on the shaft, said shaft extending through the casing and means for rotating the shaft from the exterior of the casing in order to operate any and all of the manually controlled strips.

7. Apparatus for visually indicating and comparing the progresses of a number of related activities, said apparatus comprising a plurality of strips of distinctive characteristics and adapted to be arranged in overlapping relation and movable with respect to one another, electrical means for operating one of said strips from a remote position and manual means for operating another of said strips at the position of the strips, said electrical means comprising a plurality of electromagnets having plungers which terminate in pawls and cooperate with teeth provided in the immediately adjacent strips, said manual means including a device which extends externally of the casing and is adapted to be actuated.

8. A graphical indicator comprising a series of independently movable indicators, one above the other, said indicators possessing different characteristics, and means for moving said indicators with respect to one another to graphically indicate changes by comparison in the various progresses of the activities being graphically indicated.

9. Apparatus for visually indicating and comparing progresses of a number of activities, said apparatus comprising a housing containing a plurality of indicators arranged to permit a ready comparison between the indicators, said indicators possessing different characteristics and formed of strips with serrated edges, and means including a pawl which engages each of said serrated edges for moving the indicators through predetermined distances dependent on the progress to be visually indicated of said activities.

JOHN J. STEINBERGER.

REFERENCES CITED

The following references are of record in the file of this patent:

UNITED STATES PATENTS

| Number | Name | Date |
|---|---|---|
| 1,223,039 | Cummings | Apr. 17, 1917 |
| 1,673,905 | Eriksson | June 19, 1928 |
| 1,740,978 | Goldsmith | Dec. 24, 1929 |
| 1,889,006 | Czepesi | Sept. 8, 1931 |
| 1,977,498 | Staegemann | Oct. 16, 1934 |
| 2,032,304 | Padgett | Feb. 25, 1936 |
| 2,056,490 | Skarass et al. | Oct. 6, 1936 |
| 2,145,347 | Everitt | Jan. 31, 1939 |
| 2,168,443 | Johnson | Aug. 8, 1939 |
| 2,217,881 | Allen | Oct. 5, 1940 |

FOREIGN PATENTS

| Number | Country | Date |
|---|---|---|
| 396,837 | Great Britain | Aug. 17, 1933 |